(No Model.)  L. SCOFIELD.  2 Sheets—Sheet 1.
CORN PLANTER.
No. 276,719.  Patented May 1, 1883.

Witnesses:  Inventor:
Frank D. Blanchard  Len Scofield,
D. H. Fletcher  By Hill & Dixon
Attorneys.

(No Model.) 2 Sheets—Sheet 2.

L. SCOFIELD.
CORN PLANTER.

No. 276,719. Patented May 1, 1883.

Witnesses
Frank D. Blanchard.
D. H. Fletcher.

Inventor:
Levi Scofield
By Hill & Dixon
Attorneys.

UNITED STATES PATENT OFFICE.

LEVI SCOFIELD, OF CEDAR RAPIDS, IOWA.

CORN-PLANTER.

SPECIFICATION forming part of Letters Patent No. 276,719, dated May 1, 1883.

Application filed October 12, 1882. (No model.)

*To all whom it may concern:*

Be it known that I, LEVI SCOFIELD, of Cedar Rapids, Linn county, Iowa, have invented a new and useful Improvement in Corn-Planters, of which the following is a description, reference being had to the accompanying drawings, forming a part of this specification, in which—

Figure 1:
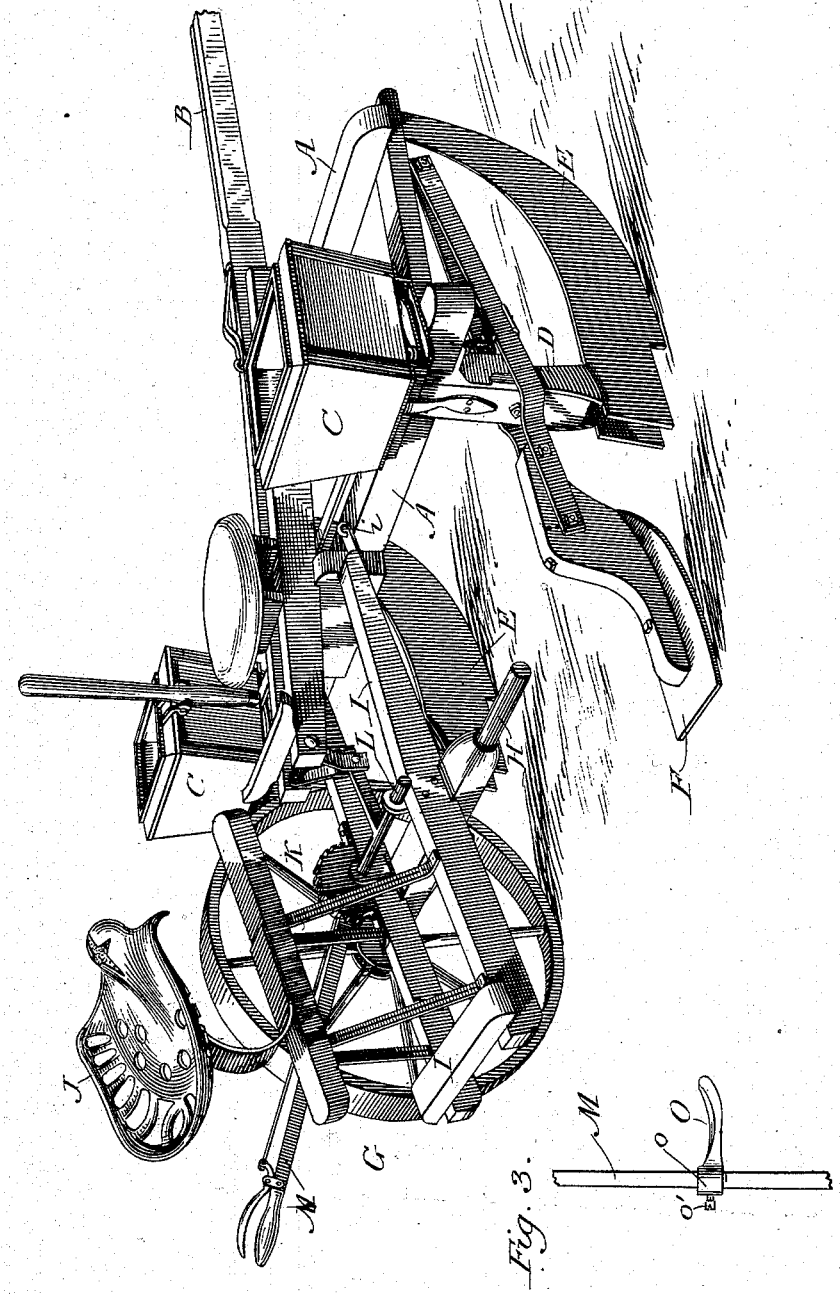
Figure 2:
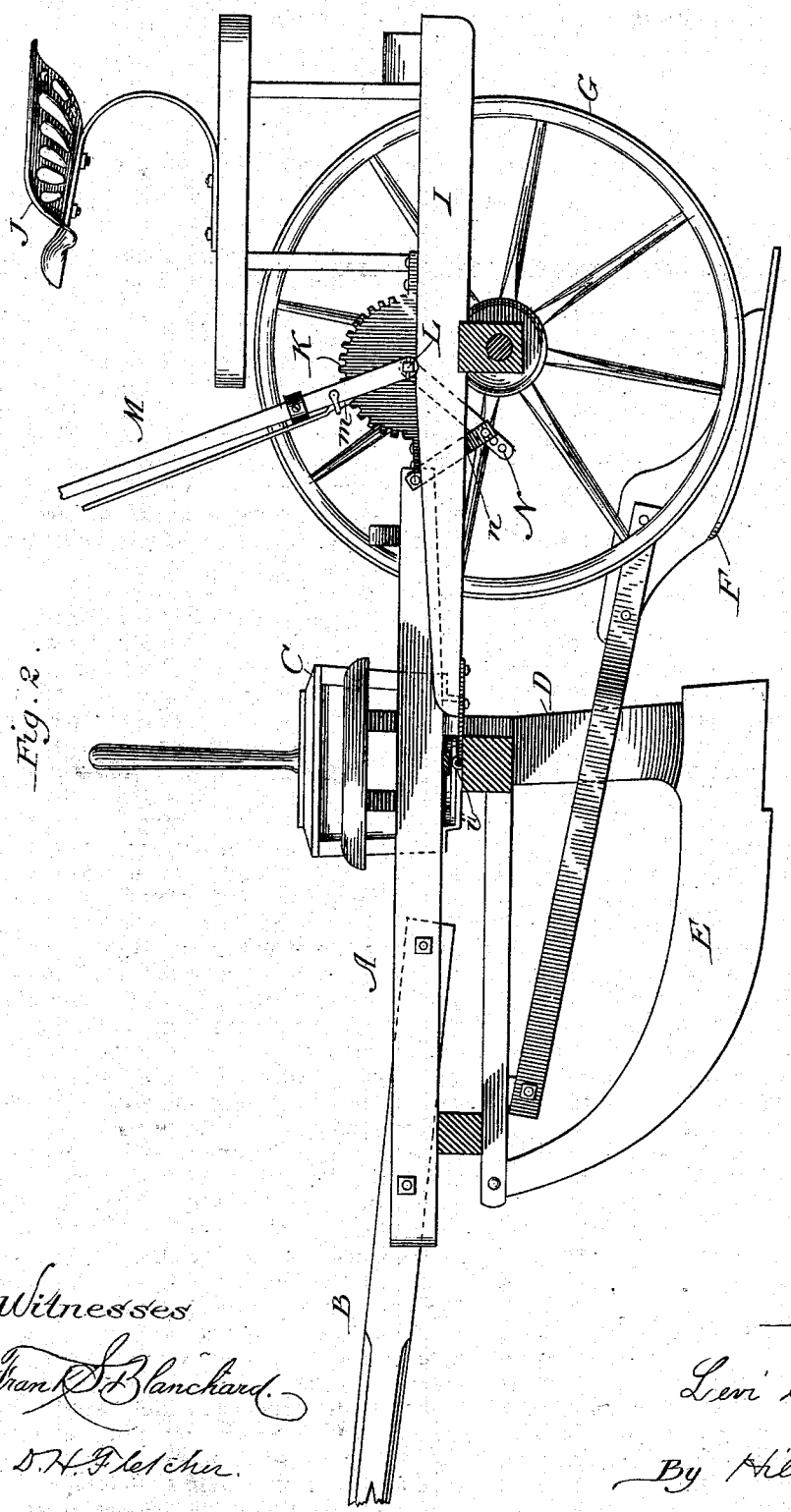

Figure 1 is a perspective view of the machine with the off wheel removed. Fig. 2 is a longitudinal vertical section of the machine, and Fig. 3 is a detached view of the adjustable foot-rest.

Similar letters of reference indicate like parts in the different figures.

My invention relates to that class of corn-planters in which there are employed a main frame, seeding devices, runners, coverers, and supporting-wheels and axle; and it consists, first, in attaching the tongue, main frame, seeding devices, runners, and coverers rigidly together, so that the runners and coverers will rise and fall together in the arc of a circle the center of which is the point where the tongue is attached to the neck-yoke, and combining them, thus attached, with supporting-wheels which are vertically adjustable independently of said arc; secondly, in fastening the runners and coverers rigidly together and combining them with independently-adjustable carrying-wheels; thirdly, in arranging the independently-adjustable carrying-wheels so that their tread or bearing-surface comes substantially in a transverse line drawn through the bearing-surfaces of the two coverers.

In the drawings, A is the frame-work of the main frame; B, the tongue; C C, the seed-boxes, having any suitable mechanism for dropping the seed; D D, the seed-tubes; E E, the runners; and F F the coverers, which may be wheels or shares. The form of all these parts is immaterial, provided they properly answer their several purposes, but are all rigidly attached together, so as to rise and fall together. The coverers are preferably adjustable vertically with relation to the runners, as shown in my patent of January 10, 1882, No. 252,265; but when adjusted they are fixed rigidly, for the time being, in their adjusted positions. It will be observed that all these parts rise and fall together with the tongue, the rear end of which moves up and down, while its front end is secured to the neck-yoke or equivalent part of the harness and does not rise and fall. Said parts, therefore, both while being vertically adjusted and when moving over inequalities in the ground, rise and fall in the arc of a circle the center of which is the point of attachment of the tongue to the neck-yoke. This arc differs so slightly from a straight vertical line that the runners and coverers, which are arranged close behind the runners, always maintain substantially the same horizontal position in which they are adjusted with relation to each other.

The carrying-wheels G G are connected to the main frame by any suitable means which enables them to be vertically adjusted with relation to said frame independently of the said arc in which the runners and coverers rise and fall, and to be secured temporarily in such adjustment. As one means of accomplishing this result, I connect their axle H to an auxiliary frame, I, which is pivoted to the main frame at *i i*, the pivots being loose enough to give the axle a slight rocking movement up and down at each end. The driver's seat J is preferably mounted on the auxiliary frame. The carrying-wheels are arranged so as to come quite close to the sides of the carrying devices, either at their outer or inner side, but preferably at the inner side, and so that the tread or bearing-surface of the wheels on the ground will come substantially in a transverse line drawn through the bearing-surfaces of the two coverers, as shown, although a little deviation either before or behind such line would be immaterial. By this means whenever the machine passes over a slight ridge or hollow in the ground—such as an old furrow or other irregularity—the wheel and its coverer will both run into the ridge or into the hollow at the same moment, and the coverer will not be raised off the ground or have an undue weight thrown upon it. The slight rocking movement of the axle also tends to relieve the coverer from disturbance in such cases.

In the construction shown in the drawings the wheels are adjusted up and down with relation to the main frame as follows:

K is a semicircular toothed sector, affixed to the auxiliary frame I.

L is a rock-shaft extending through the center of the sector and having its bearings in the frame I.

M is a hand-lever fixed to the end of the shaft L, alongside of the plate K, and provided with a spring-catch, m, the end of which engages with the teeth of the sector and locks the shaft in any required position. An arm, N, extends from the shaft to a point near the rear end of the tongue, behind the main frame, where it is coupled to the tongue by a pivoted link, n. By throwing the hand-lever forward the runners and coverers are depressed and the wheels are raised, and by throwing it backward the runners and coverers are raised and the wheels depressed, so that by properly adjusting said lever the runners and coverers may be lifted entirely off the ground, as when turning or transporting the machine; or, on the other hand, the wheels may be lifted entirely off the ground and the whole weight of the machine and attendant thrown upon the runners and coverers, as when working in very hard ground; or the depth of cut may be adjusted to suit the character and condition of the soil, and may be varied at the will of the attendant.

I prefer to make the hand-lever so that it will operate also as a foot-lever, and to this end I construct a foot-rest, O, with a socket, o, which slips down over the staff of the lever, and is adjusted and secured in any position thereon by means of a set screw, o', in order that it may be made to assume the position which will best accommodate the foot of the attendant.

It will be observed that the construction of the machine brings the carrying-wheels, runners, and coverers all near together, rendering the machine very compact and simple in its construction, and generally bringing any inequality of the ground under all of said parts at the same time, thereby preventing them from throwing each other out of action or interfering with each other in the proper performance of their work. The wheels yield independently to slight irregularities without tending to disturb the other parts. The machine has been thoroughly tested in the field, and has proved to be a substantial and material improvement in the art. Neither the runners nor the coverers are liable, as heretofore, to frequently skip their work, nor is the one liable to run too deep while the other runs to light; nor does the vertical adjustment of the runners and coverers change their proper angle to the ground, but they continue to work together harmoniously and perfectly in all kinds of soil, and are easily and conveniently managed and adjusted while in operation.

I have described the runners and coverers as rigidly connected or fastened together, so that both will rise and fall at the same time; but absolute rigidity of fastening is not indispensable, as the arm or drag-bar which secures the coverers to the main frame may, if preferred, be held in position by a strong spring, which will render its attachment practically rigid, and yet allow the coverer to yield slightly to inequalities in the ground, or the coverer may have a very slight vertical play independently of the runners. These arrangements are, however, the substantial and practical equivalents of an absolutely-rigid attachment, and are intended to be included within the expression "rigidly attached," as herein used.

What I claim as new is as follows:

1. In a corn-planter, the combination of runners and coverers rigidly attached to the tongue and capable of rising and falling together, when at work, in the arc of a circle the center of which is at the point where the tongue is attached to the neck-yoke, with carrying-wheels vertically adjustable independently of said arc, substantially as described.

2. In a corn-planter, the combination of the main frame, to which the runners are rigidly attached in close proximity to each other, with carrying-wheels vertically adjustable with relation to said main frame, substantially as described.

3. In a corn-planter, the combination of the runners, the coverers arranged close behind them, and the carrying-wheels arranged with their tread at the side of the coverers and substantially in a transverse line drawn through the bearing-surfaces of the coverers, as described.

4. In a corn-planter, the combination of a front main frame carrying the runners and coverers, rigidly attached thereto, with a pivoted rear auxiliary frame supported upon carrying-wheels and vertically adjustable with relation to the main frame, substantially as described.

LEVI SCOFIELD.

Witnesses:
D. H. FLETCHER,
T. S. E. DIXON.